(12) United States Patent
Furuta et al.

(10) Patent No.: US 7,275,368 B2
(45) Date of Patent: Oct. 2, 2007

(54) FAN REVOLUTION SPEED CONTROL METHOD

(75) Inventors: Hideto Furuta, Tokyo (JP); Nobumi Toyoura, Tokyo (JP); Kazushige Okamoto, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 349 days.

(21) Appl. No.: 10/519,904

(22) PCT Filed: Mar. 18, 2004

(86) PCT No.: PCT/JP2004/003677

§ 371 (c)(1),
(2), (4) Date: Dec. 28, 2004

(87) PCT Pub. No.: WO2005/024199

PCT Pub. Date: Mar. 17, 2005

(65) Prior Publication Data

US 2005/0254959 A1    Nov. 17, 2005

(30) Foreign Application Priority Data

Aug. 29, 2003  (JP) .............................. 2003-307467

(51) Int. Cl.
*F01P 7/04* (2006.01)
*F01P 5/04* (2006.01)
(52) U.S. Cl. ........................ 60/329; 60/422; 60/256; 60/468
(58) Field of Classification Search ............... 60/329, 60/422, 256, 468
See application file for complete search history.

(56) References Cited

U.S. PATENT DOCUMENTS 4,798,050 A * 1/1989 Nakamura et al. ............. 60/329
4,798,177 A * 1/1989 Oomura et al. .......... 123/41.12
4,941,437 A * 7/1990 Suzuki et al. .................. 60/456
6,195,989 B1 * 3/2001 Hall et al. ...................... 60/329

FOREIGN PATENT DOCUMENTS

JP       01-147113       6/1989
JP       2000-110560     4/2000
JP       2000-213350     8/2000

OTHER PUBLICATIONS

Patent Abstracts of Japan for JP01-147113 published Jun. 8, 1989.
Patent Abstracts of Japan for JP2000-110560 published Apr. 18, 2000.
Patent Abstracts of Japan for JP2000-213350 published Aug. 2, 2000.

* cited by examiner

*Primary Examiner*—Igor Kershteyn
(74) *Attorney, Agent, or Firm*—Darby & Darby

(57) ABSTRACT

The invention is a fan revolution control method for controlling a pump-motor system, by controlling the fan revolution speed of a cooling fan adapted to be rotated by a fan motor to cool cooling target fluids. The pump-motor system drives the fan motor by a hydraulic fluid fed from a fan pump driven by an engine. The pump-motor system is controlled so the fan revolution speed starts from the minimum fan revolution speed when the engine is started up; the minimum fan revolution speed is maintained for at least several seconds; after the elapse of several seconds, the fan revolution speed is gradually increased from the minimum fan revolution speed. The fan revolution speed reaches a target fan revolution speed over a period of at least several seconds. The method prevents generation of peak pressure or pressure hunting.

2 Claims, 6 Drawing Sheets

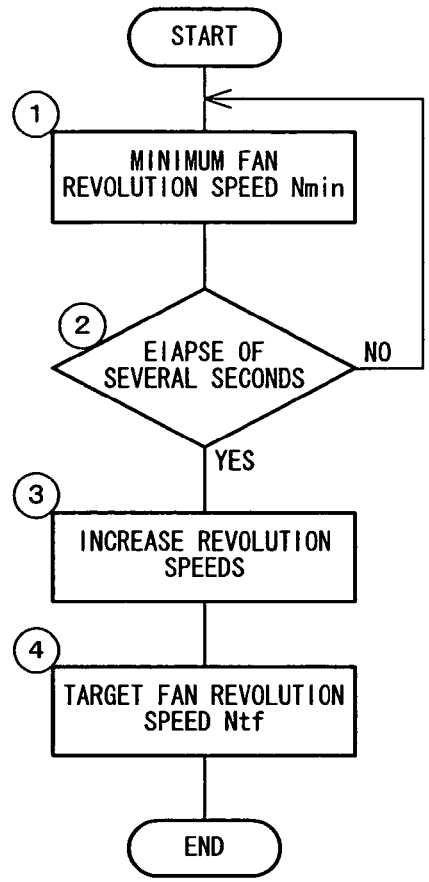
F I G. 1
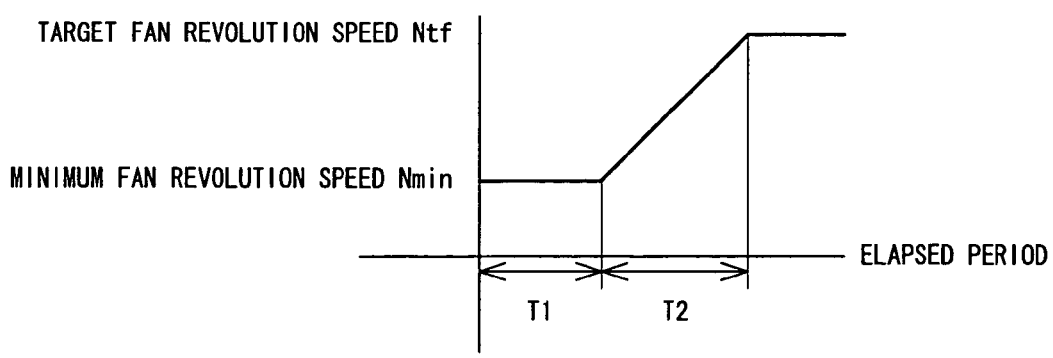
T1 : TIME ELAPSED AFTER ENGINE START-UP
T2 : TIME ELAPSED FROM MINIMUM REVOLUTION SPEED TO TARGET REVOLUTION SPEED
F I G. 2

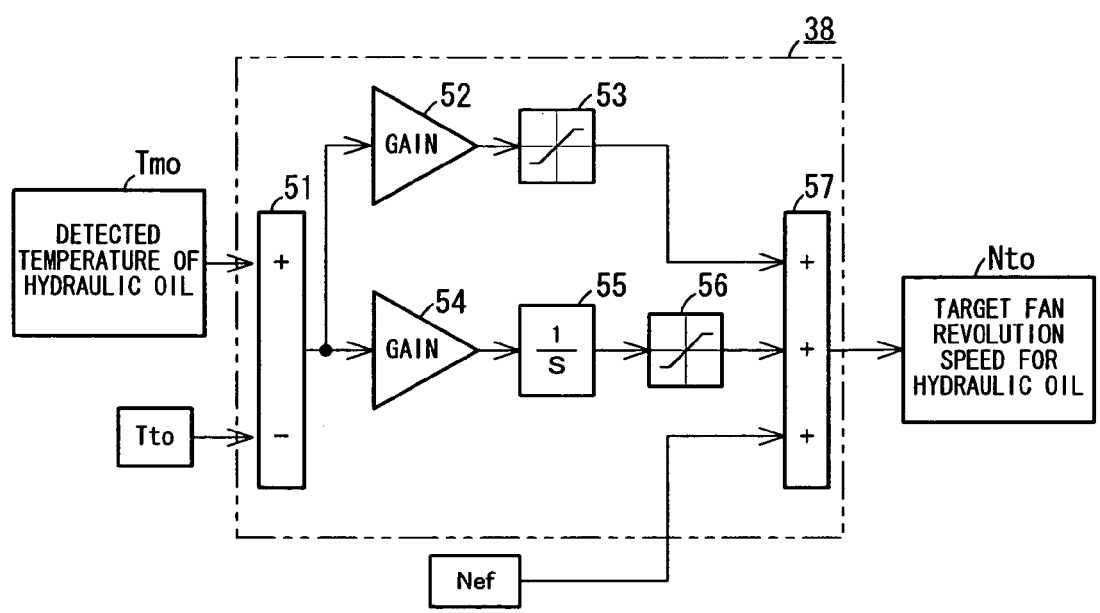
F I G. 6

FAN REVOLUTION SPEED CONTROL METHOD

CROSS-REFERENCE TO PRIOR APPLICATION

This is a U.S. national phase application under 35 U.S.C. §371 of International Patent Application No. PCT/JP2004/003677 filed in Japanese on Mar. 18, 2004 and claims the benefit of Japanese Patent Application No. 2003-307467 filed Aug. 29, 2003 both of which are incorporated by reference herein. The International Application has not been published as of the date of filing of this application.

TECHNICAL FIELD

The present invention relates to a fan revolution speed control method for controlling a fan revolution speed of a cooling fan that is adapted to cool cooling target fluids. In the explanation hereunder, a number of revolutions per unit period of time is referred to as "revolution speed".

BACKGROUND OF THE INVENTION

There are various conventional fan revolution control methods for controlling the fan revolution speed of a cooling fan adapted to be rotated by a fan motor, wherein the control of the fan revolution speed is executed by controlling the pump-motor system that serves to drive the aforementioned fan motor by means of hydraulic oil supplied from an engine-driven fan pump. Some of such control methods call for detecting a temperature of a fluid to be cooled (hereinafter referred to as cooling target fluid) by means of a temperature sensor and, based on the detected temperature of the cooling target fluid, determining a target fan revolution speed of the cooling fan that serves to cool the cooling target fluid (refer to Japanese Patent Publication No. 3295650 as an example).

The method of determining the target fan revolution speed in the fan revolution control method described in Japanese Patent Publication No. 3295650 has a distinctive feature: once a target fan revolution speed is determined, a pump capacity command electric current value, which is a control signal corresponding to a target fan revolution speed or a maximum revolution speed, is step input into an electro-hydraulic transducing valve as shown in the middle graph in FIG. 7 when an engine is started up. The aforementioned electro-hydraulic transducing valve may be an electromagnetic proportional control valve or the like and serves to control a capacity changing means of a fan pump.

A target fan revolution speed command value can be set in the range from a minimum fan revolution speed to a maximum revolution speed. In the case of the method described in Japanese Patent Publication No. 3295650, the target fan revolution speed is determined based on a target temperature, and a command signal is output to set the target fan revolution speed at a value within a range between the minimum fan revolution speed, e.g. 300 rpm, and the maximum revolution speed, e.g. 873 rpm. If the command value for the target fan revolution speed is set at, for example, 873 rpm, in accordance with the detected temperature data from the temperature sensor, the revolution speed instantly increases from 300 rpm (the minimum fan revolution speed) to 873 rpm in a step-like manner when the engine is started up for the first time. An example of a case of a step input of a pump capacity command electric current value is shown in the middle graph in FIG. 7.

As the conventional method described above calls for step input of a control signal that corresponds to a target fan revolution speed or a maximum revolution speed at the start-up of an engine, a great load is applied to a pump-motor system, which comprises a system from a fan pump to a fan motor, and causes a peak pressure or pressure hunting, resulting in the possibility of damage to the pump-motor system.

As is evident from measurement data regarding pressures of the fan pump and the fan motor shown in the upper graph in FIG. 7, a peak pressure may be generated in the pump discharge pressure of the fan pump (or the motor inlet pressure), or a great difference may arise between the motor inlet pressure and the motor outlet pressure of the fan motor and cause pressure hunting of the motor outlet pressure. Such a peak pressure or pressure hunting may cause damage to the pump-motor system, which comprises a system from the fan pump through a piping to the fan motor.

In order to solve the above problems, an object of the invention is to provide a fan revolution control method for controlling the fan revolution speed of a cooling fan by controlling the pump-motor system that serves to drive a fan motor by means of hydraulic fluid supplied from a fan pump, wherein the fan revolution control method enables prevention of a peak pressure or pressure hunting, either of which may otherwise cause damage to the pump-motor system.

DISCLOSURE OF THE INVENTION

A fan revolution speed control method according to the present invention is a method of controlling the fan revolution speed of a cooling fan that is adapted to be rotated by a fan motor so as to cool a cooling target fluid, wherein the control of the fan revolution speed is executed by controlling the pump-motor system that serves to drive the aforementioned fan motor by means of hydraulic fluid supplied from an engine-driven fan pump, the control of the pump-motor system comprising steps of detecting a temperature of a cooling target fluid, determining a target fan revolution speed of the cooling fan based on the detected temperature of the cooling target fluid, and controlling the pump-motor system so that the fan revolution speed starts from a minimum fan revolution speed at the start-up of the engine and gradually increases to the target fan revolution speed. By controlling the pump-motor system so that the fan revolution speed starts from a minimum fan revolution speed at the start-up of the engine and gradually increases to the target fan revolution speed, in other words preventing a control signal corresponding to the target fan revolution speed that has been determined based on detected temperatures of the cooling target fluids from being step input into the pump-motor system at the start-up of the engine, the method according to the invention is capable of reducing burden imposed on the fan pump and the fan motor and preventing generation of peak pressure between the fan pump and the fan motor. Furthermore, as the difference between the pump discharge pressure of the fan pump, i.e. the motor inlet pressure of the fan motor, and the motor outlet pressure of the fan motor, is limited so as to prevent pressure hunting, damage to the fan motor is prevented. The aforementioned feature of the method is also effective in preventing a hunting of the fan revolution speed.

A fan revolution speed control method according to another feature of the invention is similar to the fan revolution speed control method described above and further characterized in that the minimum fan revolution speed is maintained for a given period of time at the start-up of the engine. By maintaining the minimum fan revolution speed for a given period of time at the start-up of the engine, the control method having this feature prevents fluctuation in burden imposed on the engine, thereby stabilizing the engine speed rapidly when the engine is started up.

BRIEF DESCRIPTION OF THE DRAWINGS

FIG. 1 is a flow chart showing a fan revolution control method according to an embodiment of the present invention;

FIG. 2 is a graph illustrating how a revolution speed is increased according to the above mentioned control method;

FIG. 6 is a block diagram showing the structure of a PI control unit of the aforementioned controller.

PREFERRED EMBODIMENT OF THE INVENTION

Next, the present invention is explained hereunder, referring to an embodiment thereof shown in FIGS. 1 through 6.

Figure 4:
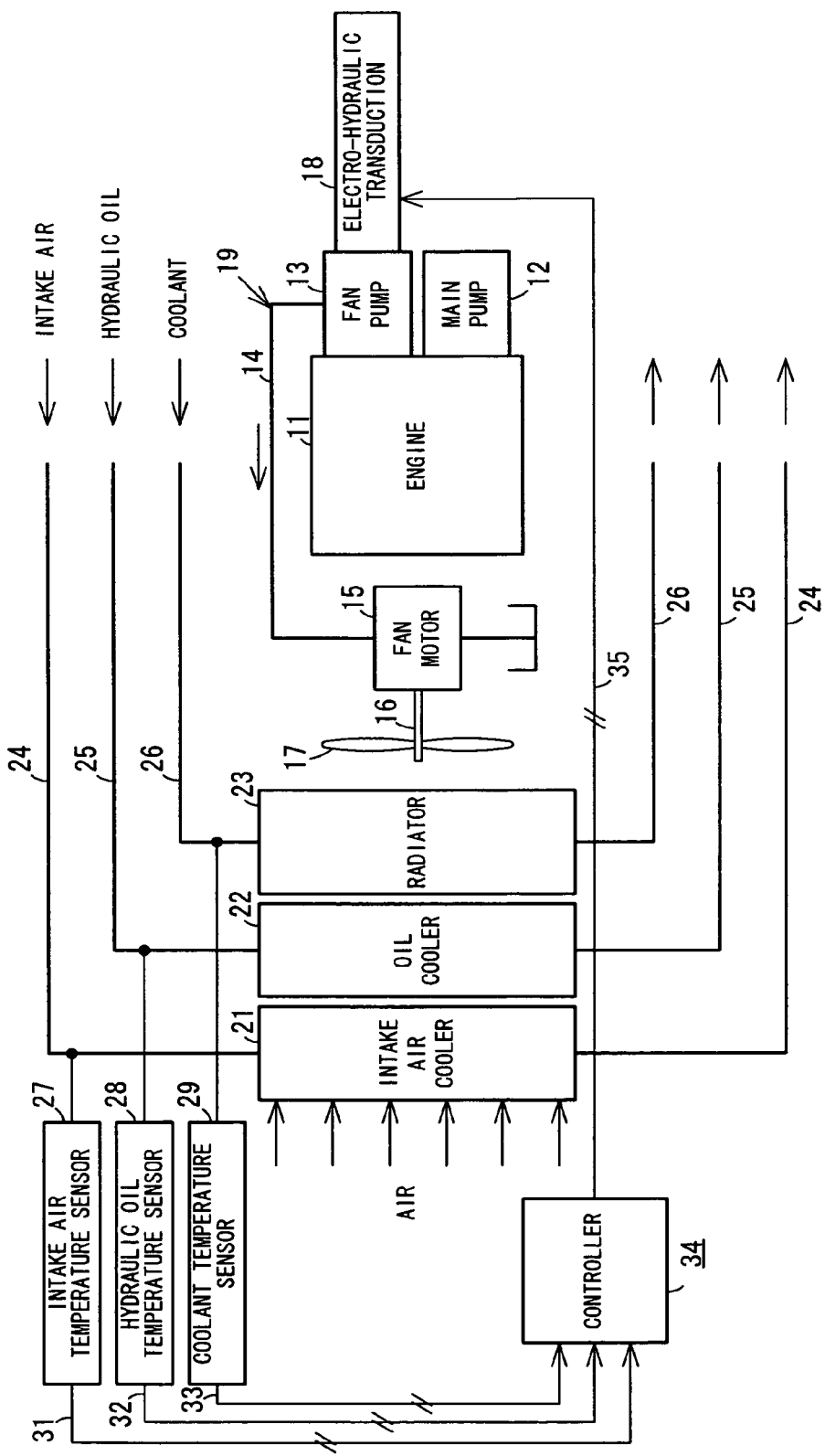
FIG. 4 is a block diagram of a fan revolution speed control device for employing the control method.

FIG. 4 shows an outline of a fan revolution speed control device. An engine 11, which is mounted on the motor vehicle of a construction machine, such as a hydraulic excavator, is provided with a main pump 12 for excavation or other work and a fan pump 13 and has a function of driving these pumps 12 and 13 together. The main pump 12 serves to feed hydraulic oil under pressure. The hydraulic excavator comprises an undercarriage and an upper structure. The undercarriage is provided with a traveling system, such as crawler belts. The upper structure is provided with a working unit system and rotatably mounted on the undercarriage, with a turning system disposed between the upper structure and the undercarriage. The working unit system comprises a boom, an arm, a bucket, and hydraulic cylinders for operating these components.

The main pump 12 serves to feed hydraulic fluid, i.e. hydraulic oil, to various hydraulic actuators, including hydraulic motors of the traveling system, a hydraulic motor of the turning system, and the hydraulic cylinders of the working unit system.

The fan pump 13 serves to drive a fan motor 15 by means of hydraulic fluid that is hydraulic oil discharged into a pipe line 14. The fan motor 15 is provided with a cooling fan 17, which is integrally attached to a rotary shaft 16 of the fan motor 15 so as to be rotated by the fan motor 15.

The fan pump 13 is provided with an electro-hydraulic transducing valve 18, which is adapted to receive electrical input signals and output hydraulic signals, so that the fan pump 13 functions as a variable delivery pump to perform variable control of the rotation speed of the fan motor 15 by changing the pump discharge rate of the fan pump 13 based on hydraulic signals output from the electro-hydraulic transducing valve 18. The electro-hydraulic transducing valve 18 may be an electromagnetic proportional control valve.

The hydraulic circuit that comprises a system from the fan pump 13, which is a variable delivery pump having a capacity to be controlled by the electro-hydraulic transducing valve 18, through the pipe line 14 to the fan motor 15 serves as a pump-motor system 19 for controlling the fan revolution speed of the fan motor 15 by means of flow rate of the hydraulic oil fed from the fan pump 13.

An intake air cooler 21, an oil cooler 22, and a radiator 23 are sequentially disposed opposite the cooling fan 17. The intake air cooler 21, the oil cooler 22, and the radiator 23 are respectively provided with an intake air pipeline 24, a hydraulic oil pipeline 25, and a coolant pipeline 26.

The intake air pipeline 24 is provided with an intake air temperature sensor 27 for detecting a temperature of intake air, which is a cooling target fluid. The hydraulic oil pipeline 25 is provided with a hydraulic oil temperature sensor 28 for detecting a temperature of hydraulic oil, which is another cooling target fluid. The coolant pipeline 26 is provided with a coolant temperature sensor 29 for detecting a temperature of coolant (cooling water), which is yet another cooling target fluid. These temperature sensors 27,28,29 are connected to a signal input part of a controller 34 through respective input signal lines 31,32,33.

A signal output part of the controller 34 is connected to a signal input part of the aforementioned electro-hydraulic transducing valve 18 through an output signal line 35.

The controller 34 is adapted to process signals representing the temperature data detected by the temperature sensors 27,28,29 and output signals for the electro-hydraulic transducing valve 18 to change the pump discharge rate of the fan pump 13 based on the signals output from the controller 34, thereby controlling the fan revolution speed of the cooling fan 17 in order to bring detected temperatures of the cooling target fluids, such as the intake air, the hydraulic oil, and the coolant, which are respectively detected by the temperature sensors 27,28,29, down to the same level as the predetermined respective target temperatures. The controller 34 thus cools the cooling target fluids appropriately to prevent overheating.

As described above, the controller 34 serves to perform variable control of the fan revolution speed so that the detected temperatures of the cooling target fluids cooled by the cooling fan 17 are brought down to the respective target temperatures. Another function of the controller 34 is to reduce the revolution speed of the cooling fan 17, thereby indirectly increasing the output power of the main pump 12.

To be more specific, the fan motor 15 is operated by hydraulic oil discharged from the fan pump 13, which is driven by the engine 11 together with the main pump 12. The fan motor 15 rotates the cooling fan 17. At that time, the controller 34 can control the fan pump 13 so as to reduce the revolution speed of the cooling fan 17 so that the fan driving energy, which is consumed by the fan pump 13 and the fan motor 15, is reduced, resulting in reduction in the output power of the main pump 12 by the amount equivalent to the reduction of the fan driving energy.

Figure 5:
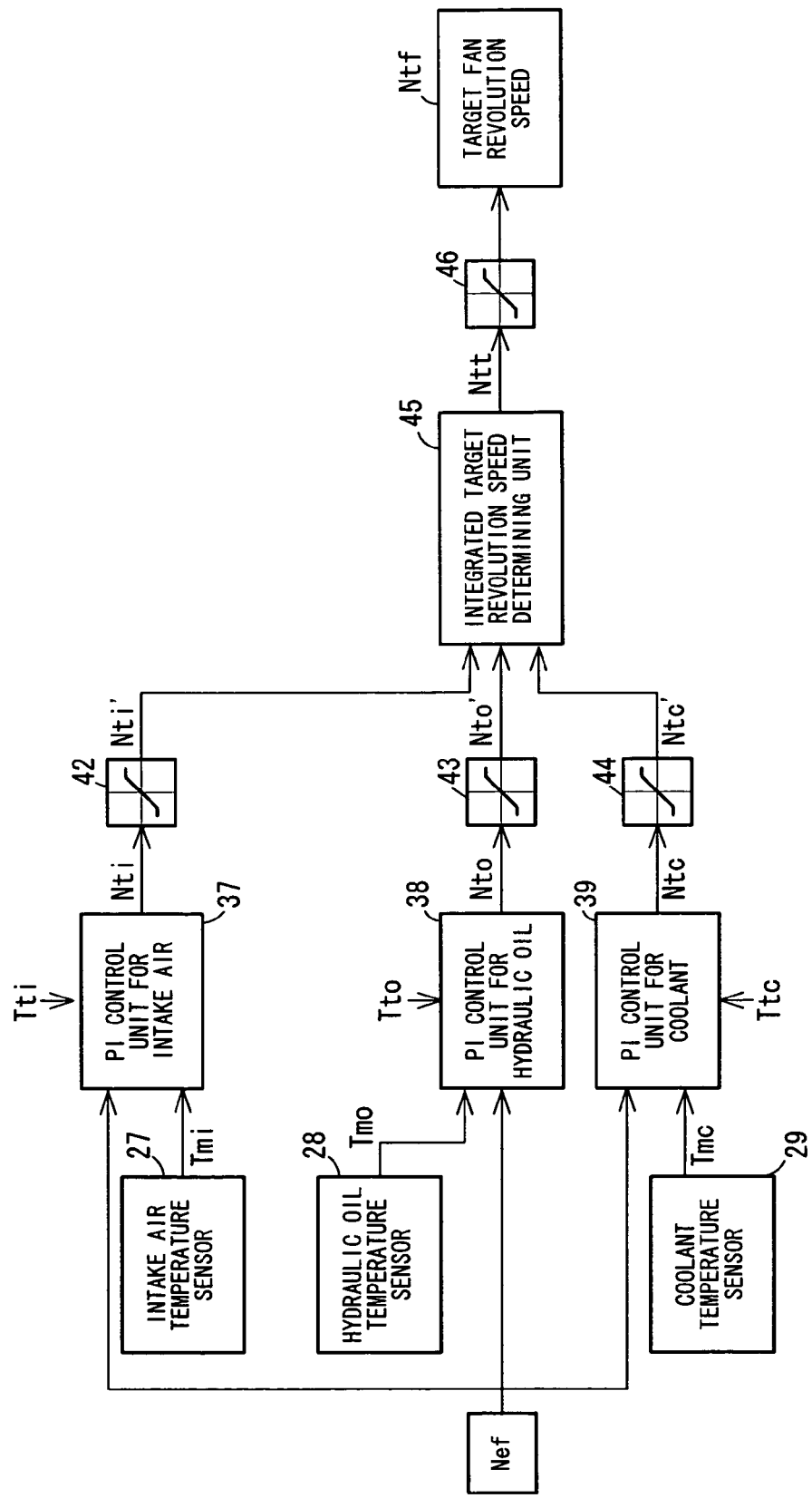
FIG. 5 is a block diagram showing an algorithm for a controller of the aforementioned fan revolution speed control device to control the fan revolution speed based on a detected temperature of a cooling target fluid.
Figure 7:
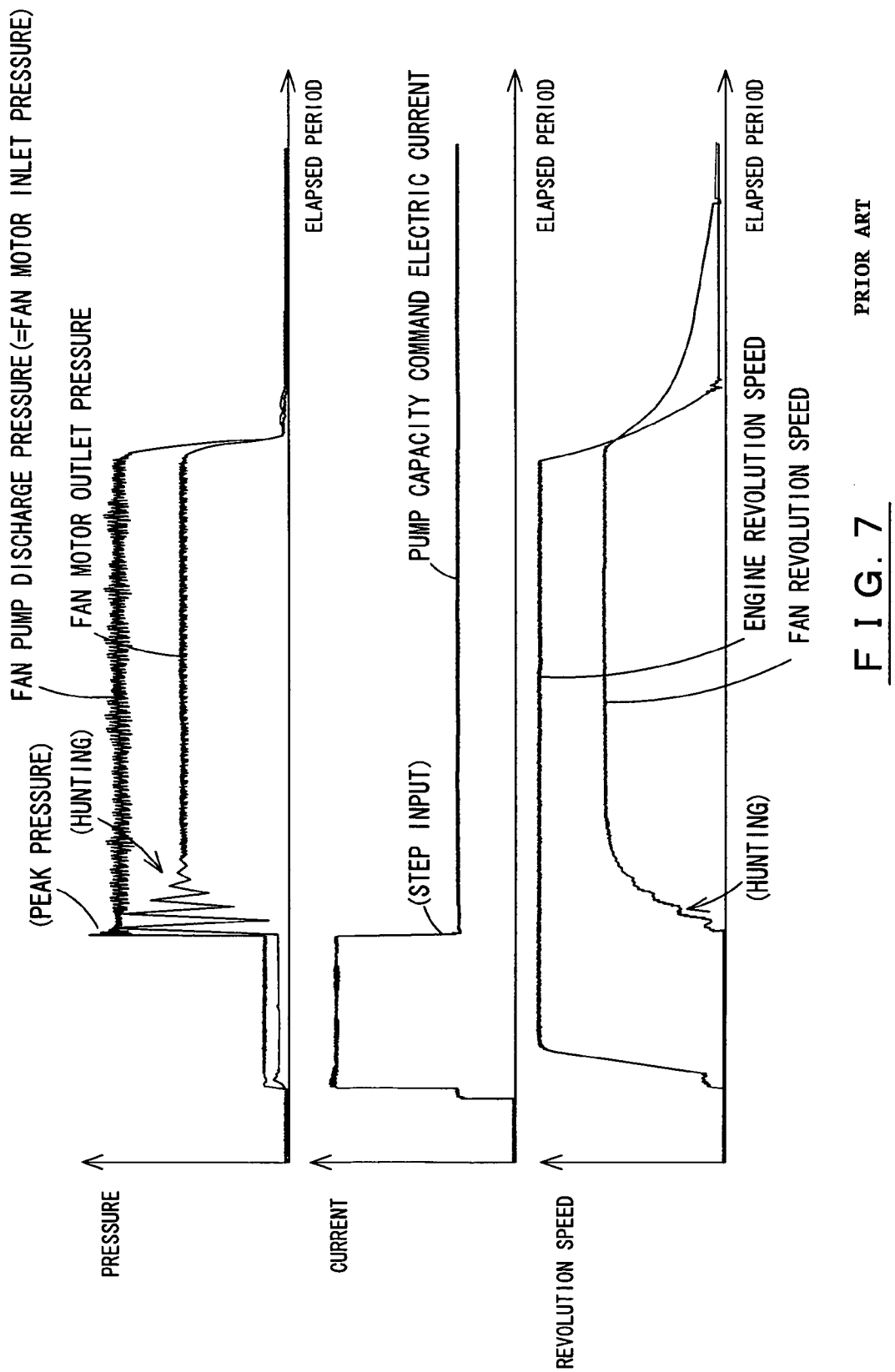
FIG. 7 is a graph illustrating how the pressure, electric current, and revolution speed change under control by a conventional fan revolution control method.

As shown in FIG. 5, the controller 34 has an algorithm to perform variable control of the fan revolution speed based on detected temperatures of the respective cooling target fluids.

Referring to FIG. 5, signals that represent various temperatures, i.e. a predetermined intake air target temperature Tti, a detected intake air temperature Tmi detected by the intake air temperature sensor 27, a predetermined hydraulic oil target temperature Tto, a detected hydraulic oil temperature Tmo detected by the hydraulic oil temperature sensor 28, a predetermined coolant target temperature Ttc, and a detected coolant temperature Tmc detected by the coolant temperature sensor 29, are input into their corresponding proportional integral control units, which are respectively provided for the different types of cooling target fluids. In the explanation hereunder, these proportional integral control units are referred to as PI control units 37,38,39.

The PI control units 37,38,39 serve to determine a plurality of target fan revolution speeds respectively for the various cooling target fluids, i.e. the intake air, the hydraulic oil, and the coolant, based on the calorific value and the ambient temperature of each respective cooling target fluid. Signals representing a target fan revolution speed Nti for the intake air, a target fan revolution speed Nto for the hydraulic oil, and a target fan revolution speed Ntc for the coolant, are output from the PI control units 37,38,39 respectively. Limiters 42,43,44 having saturation characteristics are provided so that each limiter 42,43,44 sets the upper and lower limits of each respective signal Nti,Nto,Ntc.

The target fan revolution speed Nti' for the intake air, the target fan revolution speed Nto' for the hydraulic oil, and the target fan revolution speed Ntc' for the coolant that have passed through the limiters 42,43,44 are input into an integrated target revolution speed determining unit 45, which determines a single integrated target revolution speed Ntt by performing calculation using these target fan revolution speeds.

The integrated target revolution speed determining unit 45 may perform the aforementioned calculation by, for example, squaring each target fan revolution speed Nti',Nto', Ntc' of each respective cooling target fluid, summing up the squared values, and calculating the root of the sum. The equation can be expressed as:

$$Ntt=\{\Sigma(\text{target fan revolution speed of each cooling target fluid } n)^2\}^{1/2} \text{ or}$$

$$Ntt=\{(Nti')^2+(Nto')^2+(Ntc')^2\}^{1/2}$$

Upon being passed through a limiter 46, which has saturation characteristics so as to set the upper and lower limits of each integrated target revolution speed Ntt, the integrated target revolution speed Ntt resulting from the calculation becomes the final target fan revolution speed Ntf.

FIG. 6 shows in detail the aforementioned PI control unit 38 for temperature of the hydraulic oil.

Referring to the drawing, a target temperature Tto and a detected temperature Tmo of the hydraulic oil are introduced to a comparator 51, which serves to calculate the difference between these temperatures. A signal value is produced by multiplying a differential signal output from the comparator 51 by a gain 52 and then setting the upper and lower limits of the resulting value by means of a limiter 53, which has saturation characteristics. Another signal value is produced by multiplying the aforementioned differential signal by a gain 54, performing integration of the resulting value by means of an integrator 55, and then setting the upper and lower limits of the resulting value by means of a limiter 53. By summing up the aforementioned signal values and an expected fan revolution speed Nef by means of an adder 57, the aforementioned target fan revolution speed Nto for the hydraulic oil is determined.

In the same manner as above, the PI control unit 37 processes a target temperature Tti and a detected temperature Tmi of the intake air to determine a target fan revolution speed Nti for the intake air, and the PI control unit 39 processes a target temperature Ttc and a detected temperature Tmc of the coolant to determine a target fan revolution speed Ntc for the coolant.

The aforementioned controller 34 serves to control the fan revolution speed of the cooling fan 17 by controlling the electro-hydraulic transducing valve 18 of the pump-motor system 19 for driving the fan motor 15, which rotates the cooling fan 17. The pump-motor system 19 is adapted to drive the fan motor 15 by means of hydraulic oil fed from the fan pump 13, which is driven by the engine 11. In controlling the electro-hydraulic transducing valve 18, the controller 34 determines a target fan revolution speed Ntf based on detected temperatures of the respective cooling target fluids, i.e. the intake air, the hydraulic oil, and the coolant, detected by the temperature sensors 27,28,29. The controller 34 does not output the target fan revolution speed Ntf simultaneously with the start-up of the engine but performs control so that the fan revolution speed reaches the target fan revolution speed Ntf over a period of time.

To be more specific, as shown in the flow chart of FIG. 1, the controller 34 controls the electro-hydraulic transducing valve 18 of the pump-motor system 19 so that the fan revolution speed starts from the minimum fan revolution speed Nmin when the engine is started up (Step 1); the minimum fan revolution speed Nmin is maintained for at least several seconds (Step 2); after the elapse of at least several seconds, the fan revolution speed is gradually increased from the minimum fan revolution speed Nmin (Step 3); and that the fan revolution speed reaches the target fan revolution speed Ntf over a period of at least several seconds from the initiation of increase of the fan revolution speed (Step 4).

As shown in FIG. 2, the controller 34 maintains the fan revolution speed at the start-up revolution speed, i.e. the minimum fan revolution speed Nmin, for a given period of time T1, e.g. 10 seconds, after the engine is started up and takes another given period of time T2, e.g. 10 seconds, to gradually increase the fan revolution speed up a given, constant gradient from the minimum fan revolution speed Nmin to the target fan revolution speed Ntf. Each period T1,T2 may be a fixed time or can be easily changed by changing the setting of the software application.

Next, the procedure of the fan revolution speed control method is sequentially explained.

(1) The temperatures of the intake air, the hydraulic oil, and the coolant (cooling water) of the engine 11 are respectively detected by the temperature sensors 27,28,29.

(2) The difference between the target temperature of each cooling target fluid, which is set in the controller 34 beforehand, and its corresponding detected temperature detected by each respective temperature sensor 27,28,29 is calculated by the comparator 51 of the corresponding PI control unit 37,38,39. Then, proportional integral control is performed on each calculated difference by using the gains 52,54 and the integrator 55.

(3) As a result of the PI control described above, the target fan revolution speeds Nti,Nto,Ntc of the respective cooling target fluids are determined. With these target fan revolution speeds input through the limiters 42,43,44, the target fan revolution speeds Nti',Nto',Ntc' are determined.

(4) The integrated target revolution speed determining unit 45 determines a single integrated target revolution speed Ntt from the plurality of target fan revolution speeds Nti',Nto',Ntc'. For example, the integrated target revolution speed may be determined by calculation that uses the equation $Ntt=\{\Sigma(\text{target fan revolution speed of each cooling target fluid } n)^2\}^{1/2}$.

With the integrated target revolution speed Ntt input through the limiter 46, the final target fan revolution speed Ntf is determined.

(5) Although the target fan revolution speed Ntf has been determined as above, the fan revolution speed of the cooling fan 17 is not brought to the target fan revolution speed Ntf at the start-up of the engine; the control of the fan revolution speed is always conducted so that the initial fan revolution speed is the minimum fan revolution speed Nmin. By driving the electro-hydraulic transducing valve 18, which may be an electromagnetic proportional control valve or the like, to obtain the minimum fan revolution speed Nmin, the controller 34 controls the motor revolution speed of the fan motor 15 by controlling the pump discharge rate of the fan pump 13. Thus, the fan revolution speed of the cooling fan 17 is brought to the minimum fan revolution speed Nmin.

(6) The fan revolution speed is maintained at for a period of, for example, at least 10 seconds so as to reduce the burden imposed on the fan pump 13 and the fan motor 15. The length of time for which the fan revolution speed is maintained at the minimum fan revolution speed Nmin may be a fixed period of time or can be easily changed by changing the setting of the software application.

(7) After the minimum fan revolution speed Nmin is maintained for at least several seconds, for example 10 seconds, the fan revolution speed is increased over a period of at least several seconds, for example 10 seconds, to reach the target fan revolution speed Ntf. The length of time over which the fan revolution speed is increased to reach the target fan revolution speed Ntf may be a fixed time or can be easily changed by changing the setting of the software application.

During the course of control described above, the controller 34 increases the pump discharge rate of the fan pump 13 by gradually changing the command electric current value output from the controller 34 to the electro-hydraulic transducing valve 18 so as to obtain the target fan revolution speed Ntf. Thus, the control is conducted so as to bring the fan revolution speed of the cooling fan 17 to the target fan revolution speed Ntf.

(8) In order for the detected temperatures of the cooling target fluids to reach the respective target temperature, the process returns to (2) described above and continues feedback control.

As shown in FIGS. 5 and 6, PI control unit 37,38,39 includes a comparator 51 and other necessary components. The temperatures of the cooling target fluids, i.e. the intake air, the hydraulic oil, and the coolant, are respectively detected by the temperature sensors 28,28,29. Based on data of these temperatures of the cooling target fluids and the target fan revolution speed Ntf, which is obtained by means of the PI control units 37,38,39, the limiter 46, etc., the revolution speed of the cooling fan 17 is controlled so that the actual temperature of each cooling target fluid reaches each respective target temperature.

To summarize, information of the temperatures of the cooling target fluids detected by the temperature sensors 28,28,29 is constantly or periodically fed back to calculation of fan revolution speeds so that in cases where the detected temperature of any cooling target fluid from among the intake air, the hydraulic oil, and the coolant is higher than its corresponding target temperature, the target fan revolution speed Ntf is increased based on the difference in temperature so as to achieve a better cooling effect. Thus, the fan revolution speed is controlled without using a revolution speed sensor.

Should the calorific value of a cooling target fluid increase, the corresponding PI control unit 37,38,39 functions so that a higher fan revolution speed is required for the temperature detected by the corresponding temperature sensor 27,28,29 to reach the preset target temperature.

For example, in cases where the target temperature and the detected temperature of the hydraulic oil are 60° C. and 61° C. respectively, the fan revolution speed of the cooling fan 17 begins to increase so that the detected temperature is brought down to 60° C. If the calorific value is very small, a minimal increase in the fan revolution speed is sufficient for the detected temperature to return to 60° C. However, should the calorific value be great, a minimal increase in the fan revolution speed is not sufficient to stop the increase in the temperature of the hydraulic oil. As a result, the fan revolution speed, too, continues to increase. When the fan revolution speed eventually reaches a sufficient level, the temperature of the hydraulic oil starts to decrease. The increase in the fan revolution speed stops when the temperature of the hydraulic oil reaches the target temperature.

Furthermore, even if the conditions of the target temperature and the calorific value are the same, an increase in an ambient temperature results in a higher fan revolution speed of the cooling fan 17 as described previously.

As explained above, a value to which the fan revolution speed is controlled is determined based on the calorific value and the ambient temperature of each respective cooling target fluid. In other words, a feature of the control method according to the present embodiment lies in the absence of a map specifying each temperature and its corresponding fan revolution speeds.

To summarize, as shown in FIGS. 1 and 2, the fan revolution control method described above calls for maintaining the minimum fan revolution speed Nmin, for a given period of time T1, e.g. 10 seconds, immediately after the start-up of the engine, and, when the set period T1 has elapsed, gradually increasing the fan revolution speed from the minimum fan revolution speed Nmin to the target fan revolution speed Ntf, which has been calculated using an algorithm shown in FIGS. 5 and 6, over another given period of time T2, e.g. 10 seconds, in such a manner that the fan revolution speed is increased in proportion to the elapsed period of time.

Figure 3:
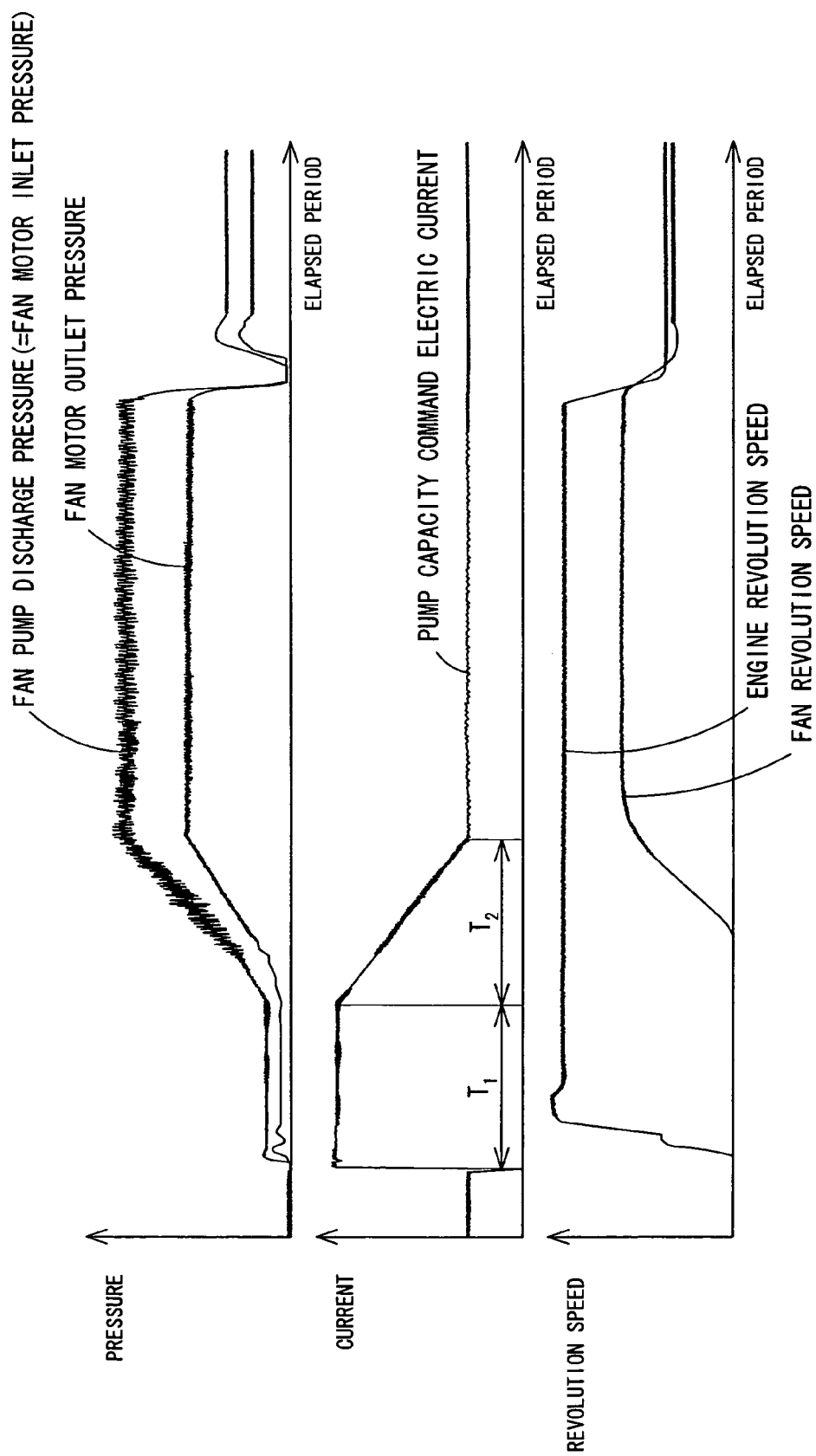
FIG. 3 is a graph illustrating how the pressure, electric current, and revolution speed change under control by the control method.

In other words, when the engine is started up, a pump capacity command electric current having a constant value, which is represented by T1 in the middle graph in FIG. 3, is supplied to the electro-hydraulic transducing valve 18 of the pump-motor system 19 so that the fan revolution speed is controlled to always start from the minimum fan revolution speed Nmin rather than being immediately brought to the target fan revolution speed Ntf that has been determined by calculation and that the minimum fan revolution speed Nmin is maintained for at least several seconds. Therefore, the burden imposed on the fan pump 13 and the fan motor 15 can be reduced. Furthermore, maintaining the minimum fan revolution speed Nmin for a given period of time at the start-up of the engine prevents fluctuation in burden imposed on the engine, thereby stabilizing the engine speed rapidly when the engine is started up.

Immediately after the start-up of the engine, a pump capacity command electric current having a value that gradually changes in proportion to the elapsed period, which is represented by T2 in the middle graph in FIG. 3, is supplied to the electro-hydraulic transducing valve 18 of the pump-motor system 19 so that the fan revolution speed is slowly increased over at least several seconds from the minimum fan revolution speed Nmin to the target fan revolution speed Ntf. In other words, at the start-up of the engine, a control signal corresponding to the target fan revolution speed Ntf that has been determined based on detected temperatures of the cooling target fluids is not step input into the pump-motor system 19. Therefore, as shown in the upper graph in FIG. 3, the control described above protects the fan pump 13 and the fan motor 15, as well as the pipe line 14 provided therebetween, from damage by preventing peak pressure from being generated between the fan pump 13 and the fan motor 15. Furthermore, by reducing the difference between the pump discharge pressure of the fan pump 13, i.e. the motor inlet pressure of the fan motor 15, and the motor outlet pressure of the fan motor 15, the control described above prevents a hunting of the motor outlet pressure, thereby enabling the smooth increase of the motor outlet pressure and, as a result, preventing damage to the fan motor 15.

Furthermore, as shown in the lower graph in FIG. 3, the method of the invention is also effective in preventing a hunting of the fan revolution speed.

Furthermore, as no sudden change in the flow rate of hydraulic oil will occur, generation of unnatural noises in the fan pump 13 or the fan motor 15 is prevented. As there is no sudden change in the fan revolution speed, the sound produced by the cooling fan 17 rises in a natural manner so that the operator is free from the problem of disagreeable noises. The problem of a peak pressure impairing revolution of the cooling fan 17 can be prevented.

Furthermore, the control method according to the invention can be easily employed by means of command current to the electro-hydraulic transducing valve 18, which is an electromagnetic proportional control valve, by a software. Therefore, unlike a method using a hydraulic component, such as providing a relief valve between the fan pump 13 and the fan motor 15, the method according to the invention enables the prevention of peak pressure without increasing production costs.

POSSIBLE INDUSTRIAL APPLICATION

The present invention is applicable to not only a construction machine, such as a hydraulic excavator, but also any other work machine that requires control of the pump-motor system in order to control the fan revolution speed of a cooling fan of the work machine.

The invention claimed is:

1. A fan revolution speed control method for controlling a pump-motor system so as to control the fan revolution speed of a cooling fan that is adapted to be rotated by a fan motor so as to cool a cooling target fluid, said pump-motor system adapted to drive said fan motor by means of hydraulic fluid supplied from an engine-driven fan pump, wherein said fan revolution speed control method comprises steps of:

detecting a temperature of a cooling target fluid, determining a target fan revolution speed of said cooling fan based on the detected temperature of said cooling target fluid, controlling said pump-motor system so that the fan revolution speed starts from a minimum fan revolution speed at the-start-up of the engine, wherein said minimum fan revolution speed is a predetermined speed not dependent upon the detected temperature of said cooling target fluid, and further controlling said pump-motor system so that the fan revolution speed gradually increases to said target fan revolution speed.

2. A fan revolution speed control method as claimed in claim 1, wherein: said minimum fan revolution speed is maintained for a given period of time at the start-up of the engine.

\* \* \* \* \*